(12) United States Patent
Shen et al.

(10) Patent No.: US 8,274,923 B2
(45) Date of Patent: Sep. 25, 2012

(54) WIRELESS ACCESS CONTROL METHOD, RELAY STATION AND BASE STATION

(75) Inventors: Gang Shen, Shanghai (CN); Wei Ni, Shanghai (CN); Erwu Liu, Shanghai (CN); Shan Jin, Shanghai (CN)

(73) Assignee: Alcatel Lucent, Paris (FR)

( * ) Notice: Subject to any disclaimer, the term of this patent is extended or adjusted under 35 U.S.C. 154(b) by 1094 days.

(21) Appl. No.: 11/558,193

(22) Filed: Nov. 9, 2006

(65) Prior Publication Data

US 2007/0110016 A1   May 17, 2007

(30) Foreign Application Priority Data

Nov. 11, 2005   (CN) .......................... 2005 1 0110324

(51) Int. Cl.
   *H04B 7/14*   (2006.01)
(52) U.S. Cl. .............................. 370/315; 455/7; 455/517
(58) Field of Classification Search .................. 455/445, 455/517; 370/315
   See application file for complete search history.

(56) References Cited

U.S. PATENT DOCUMENTS

| | | | |
|---|---|---|---|
| 2004/0192204 A1* | 9/2004 | Periyalwar et al. | 455/25 |
| 2005/0232183 A1* | 10/2005 | Sartori et al. | 370/319 |
| 2006/0252367 A1* | 11/2006 | Haartsen | 455/11.1 |
| 2007/0058577 A1* | 3/2007 | Rubin | 370/328 |
| 2007/0280172 A1* | 12/2007 | Tan et al. | 370/335 |

FOREIGN PATENT DOCUMENTS

| | | | |
|---|---|---|---|
| DE | 19950005 A1 | 4/2001 |
| DE | 10027115 A1 | 12/2001 |
| DE | 10145759 A1 | 4/2003 |

OTHER PUBLICATIONS

1) Shoji Kaneko Proposed Relay Method with P-MP Structure of IEEE 802.16-2004 2005 IEEE 16th International Symposium on Personal, Indoor and Mobile Radio Communications Sep. 14, 2005.*
Deng Shiqiang Recommendation on Mobility Management of Mobile Multi-hop Relay IEEE 802.16 Presentation Submission Template, Nov. 11, 2005.* Yong Chang Changes on 802.16e to support the flexible management of session information IEEE 802.16 Broadband Wireless Access Working Group Mar. 11, 2004.*

(Continued)

*Primary Examiner* — Dwayne Bost
*Assistant Examiner* — Edward Zhang
(74) *Attorney, Agent, or Firm* — Fay Sharpe LLP

(57) ABSTRACT

The present invention provides a wireless access control method, relay station and base station. The wireless access control method according to the present invention is characterized in that under the control of said base station, information of said subscriber station and said base station is received and forwarded via a wireless channel by using the relay station. Said method further comprises the steps of: uplink bearer data and control information from said subscriber station being first received by said relay station and then forwarded to said base station; downlink bearer data from said base station being first received by said relay station and then forwarded to said subscriber station. Said base station sends control information directly to the subscriber station. The present invention further comprises a relay station for implementing the above method and an improved base station. In the method and devices provided by the present invention, with the introduction of relaying access technique, subscriber stations located with the long distance to the base station or in shadowing areas may be connected by relaying.

20 Claims, 9 Drawing Sheets

OTHER PUBLICATIONS

Fang-Ching Ren A Recommendation on PMP Mode Compatible Frame Structure IEEE 802.16 Presentation Submission Template (Rev 8.3) Sep. 9, 2005.*
Deng Shiqiang, Recommendation on Design 802.16 TGe PMP Mode Backward Compatible Frame IEEE 802.16 Broadband Wireless Access Working Group ==Sep. 9, 2005==.*
P802.16j PAR and Five Criteria: Mobile Multihop RelayIEEE 80216mmr-06_002r1, pp. 1-6.
Kevin Baum, et al., Transparent Uplink Relaying for OFDMA, IEEE C802.16e-04/417, Nov. 4, 2004, 1 cover page and pp. 1-8
Deng Shiqiang, et al., Recommendation on Design 802.16 TGe PMP mode backward compatible Frame Structure, IEEE C802.16mmr-05/004, Sep. 9, 2005, 1 cover page and pp. 1-4.
European Search Report dated May 14, 2009.
Database Inspec The Institution of Electrical Engineers, Stevenage, GB; Sep. 14, 2005, Kaneko S et al: "Proposed relay method with P-MP structure of IEEE 802.16-2004" XP002451812 2005 IEEE 16th International Symposium on Personal, Indoor and Mobile Radio Communications Sep. 11-14, 2005 Berlin, Germany, vol. 3, Sep. 14, 2005, pp. 1606-1610 vol. 2005 IEEE 16th International Symposium on Personal, Indoor and Mobile Radio Communications IEEE Piscataway, NJ, USA.
Aghvami H et al: "Relay-based deployment concepts for wireless and mobile broadband radio" IEEE Communications Magazine, IEEE Service Center, Piscataway, US, vol. 42, No. 9, Sep. 2004, pp. 80-89, XP011119469.

* cited by examiner

WIRELESS ACCESS CONTROL METHOD, RELAY STATION AND BASE STATION

CROSS-REFERENCE TO RELATED APPLICATION(S)

This application is based on the Chinese Patent Application No. 200510110324.1 filed on Nov. 11, 2005, the disclosure of which is hereby incorporated by reference

FIELD OF THE INVENTION

The present invention relates to a radio access system, and particularly to a broadband wireless access control method, relay station and base station.

BACKGROUND OF THE INVENTION

WiMAX (World Interoperability for Microwave Access) is a wireless metropolitan area technique based on the IEEE 802.16, with the signal transmission radius reaching a maximum of 50 kilometers. With the technique of orthogonal frequency division multiplexing (OFDM/OFDMA) which the WiMAX standard adopts, all sub-carriers in an OFDM signal are synchronized in terms of time and frequency. As a result, interference between sub-carriers is brought under control, and inter-carrier interference is suppressed. Moreover, OFDM greatly reduces the protective bandwidth between sub-carriers and enhances the spectrum utilization ratio. All these factors enable the OFDM system to achieve very high cell capacity. The WiMAX standard provides a wireless access alternative solution for services for last mile broadband access, as well as providing backhauling. Compared with other protocols, the protocol supports low latency applications such as voice and video, provides broadband connections both light-of-sight (LOS) and none-LOS (NLOS) between subscriber terminals and the base station (BS) and will support hundreds of subscribers from a single BS. It is a new and promising technique with many advantages for future wireless access networks.

However, WiMAX works at the spectrum ranging from 2 GHz to 11 GHz, and LOS propagation is preferred. As a result, the coverage area is limited, especially in urban areas. At the edge of cells or in shadowing areas, user data throughput drops sharply and some coverage blind areas can be found due to complex wireless environments. In addition, due to the high spectrum, indoor coverage turns to be a key issue and currently there is no effective solution.

Combating these problems by simply increasing the density of BS results in an increase in costs of both devices and network wiring. Therefore, the more practical solutions with low costs are expected.

SUMMARY OF THE INVENTION

It is an object of the present invention to provide a wireless access control method, relay station and base station. Relay capability is integrated into a wireless access network system, so that the system can achieve wider area coverage.

To achieve the above object, the present invention provides a wireless access control method. A system of said wireless access comprises a subscriber station and a base station, for receiving and transmitting information via wireless channels, and for under the control of said base station, receiving and forwarding information of said subscriber station and said base station by using a relay station. Said method comprises the steps of: said relay station receiving uplink bearer data and control information from said subscriber station, and forwarding them to said base station; said relay station receiving downlink bearer data from said base station and forwarding it to said subscriber station; and said base station transmitting control information directly to the subscriber station.

According to an aspect of the present invention, provided is a relay station capable of implementing the above wireless access control method, comprising: relay control means for controlling the operation of the relay station; relay receiving means for receiving information of the subscriber station and the base station over wireless channels; and relay transmitting means for transmitting information to the subscriber station and the base station via wireless channels. Under the control of the relay control means, said relay receiving means receives uplink bearer data and control information from the subscriber station, which are then forwarded to said base station by the relay transmitting means; and the relay receiving means receives downlink bearer data from said base station, which is then forwarded to said subscriber station by the relaying transmitting means.

Said relay station may further comprise: ranging means for measuring the signal strength of a ranging request of said subscriber station; and relay judging means for making analysis and judgment to decide whether to relay the forwarded information.

According to another aspect of the present invention, provided is an improved base station, comprising: base station control means for controlling information receiving and transmitting operations; base station receiving means for receiving information of the subscriber station and the relay station over wireless channels; and base station transmitting means for transmitting information to the subscriber station and the relay station via wireless channels.

In the method and devices provided by the present invention, with the introduction of relaying access technique, subscriber stations located with the long distance to BS or in shadowing areas may be connected by relaying, and link budget is expected to increase greatly, which leads to high user throughput and stability. Additionally, backward compatibility is provided. There is not any update on subscriber station. The conventional subscriber station is supported for relaying. Moreover, there is no additional latency. No matter for downlink/uplink uni-cast data transmission and uplink control signal transmission, relayed burst reaches the base station in the same frame. So there is no additional latency after the introduction of relaying. And further, in the relay station design provided by the present invention, all information schedule functions are still located in the base station, and the relay station just follows the base station's commands and scheduling. So the relay station design is simple and cheap, which helps to lower the cost of network investment.

Other features and advantages of the present invention will become more apparent upon reading of the detailed description of embodiments of the present invention, when taken in conjunction with the accompanying drawings.

DETAILED DESCRIPTION OF PREFERRED EMBODIMENTS

Referring to the accompanying drawings, a detailed description will be given to the wireless access control method and the operating principles of the relay station and the base station of the present invention.

Figure 1A:
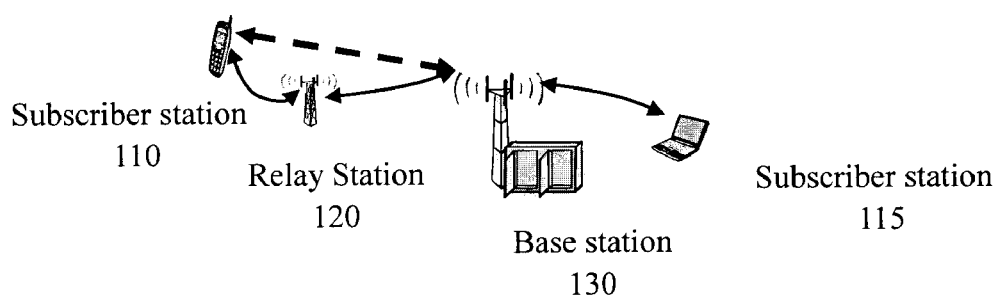
FIG. 1A depicts a schematic view of a wireless access system according to a preferred embodiment of the present invention.

FIG. 1A depicts a networking scenario of a wireless access system of the present invention. A relay station (RS) 120 is located between a subscriber station (SS) 110 and a base station (BS) 130, especially meets the case when SS110 is at the cell edge, or in shadowing areas and in buildings. In addition, information between a SS 115 and BS 130 may not be forwarded through relaying. Information is received and sent between SS 110, RS120 and BS 130 via full-duplex wireless channels that comprise downlink frequencies (or downlink for short) and uplink frequencies (or uplink for short). And information comprises control information and bearer data.

As is well known, there is a serious link budget problem at the edge of WiMAX cells or shadowing areas, which drastically reduces the user access throughput and coverage area. The present invention introduces a relay station for WiMAX system to increase the user throughput for both uplink and downlink, while it is transparent to SS and has very small impact on BS system. Through the following wireless access control method and the corresponding relay station and base station structure design, this invention succeeds in overcoming the drawback of additional latency in conventional relay access methods.

Figure 2:
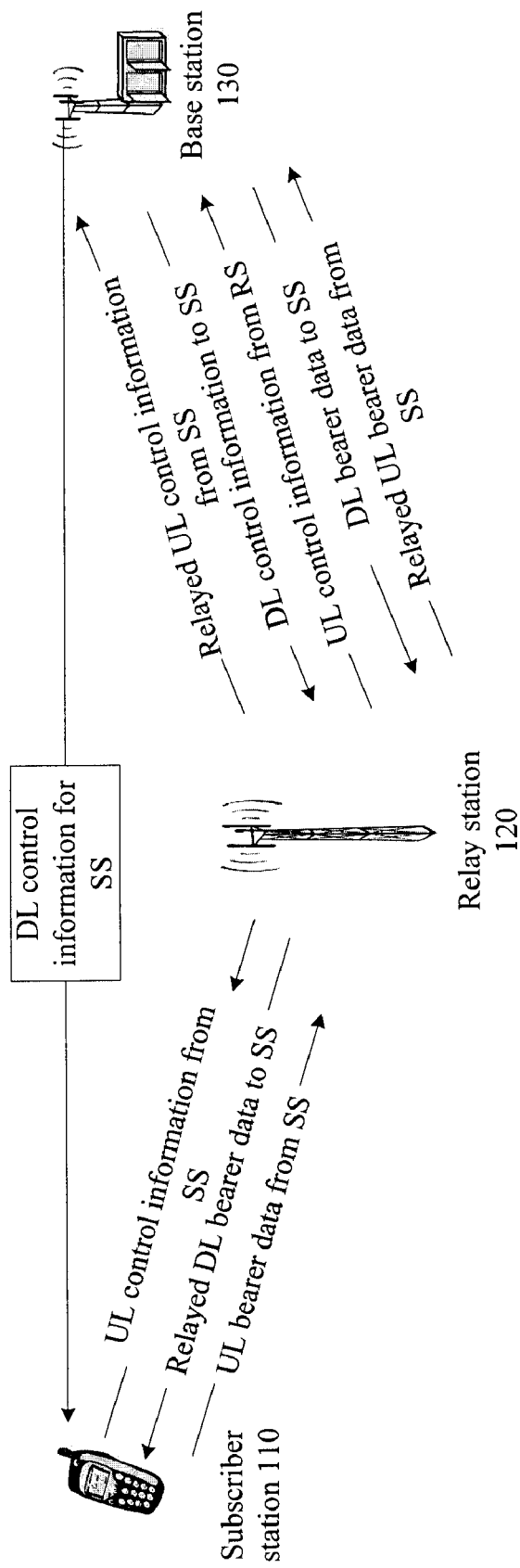
FIG. 2 depicts communication paths of wireless access control information and bearer data according to a preferred embodiment of the present invention.

FIG. 2 illustrates different communication paths of control information and bearer data from SS 110 to BS 130 via RS 120:

DL control information: BS 130→SS 120 directly communicate

UL control information: SS 110→RS 120→BS 130

DL bearer data: BS 130→RS 120→SS 110

UL bearer data: SS 110→RS 120→BS 130

This is a BS 130-centralized controlling and scheduling system. BS 130 coordinates resources to SS 110 and RS 120 in the cell by distributing control information and arbitrating access requests. RS 120 only has functionality of forwarding UL information to BS 130 and forwarding DL information to SS 110, except that DL control information for SS 110 is directly transmitted without relaying. In detail, the uplink bearer data and control information from SS 110 follow the path: first being received and decoded by RS 120 and then forwarded to BS 130, and the same procedure works on the downlink bearer data transmission with reverse direction. The direct DL control connection between BS 130 and SS 110 is beneficial to low relay forwarding latency.

The wireless access control method of the present invention is a BS 130-centralized control, which means all the control and schedule is located in BS 130, and RS 120 has less functionality and mainly focuses on data receiving and forwarding. RS 120 only needs to follow commands of BS 130 to execute data forwards. Therefore, the wireless access system of the present invention is very simple and cheap. SS 110 can receive control information from BS 130 in network environment in which the present invention works.

Figure 3A:
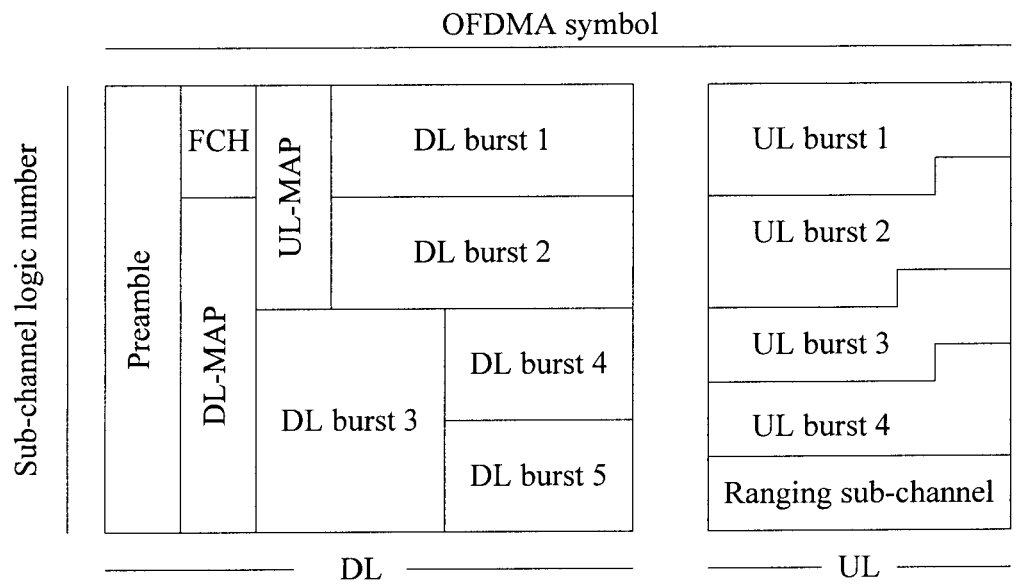
FIG. 3A depicts a schematic view of an OFDMA frame structure according to the prior art.
Figure 3B:
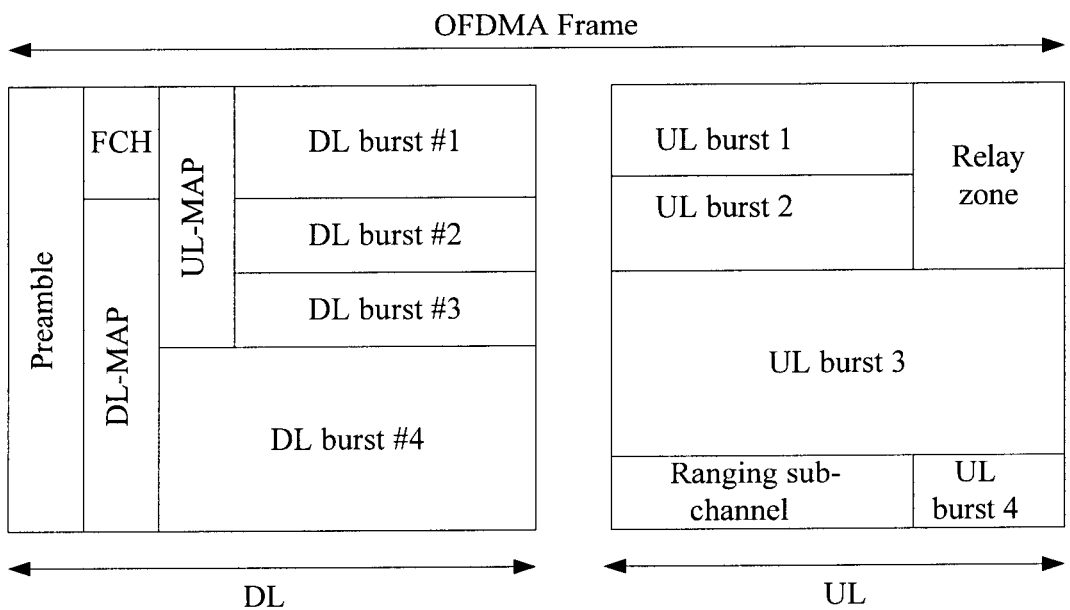
FIG. 3B depicts an OFDMA relay frame structure according to a preferred embodiment of the present invention.

A preferred embodiment of the present invention proposes a new frame structure. As illustrated in FIG. 3B, the frame structure definition is the same as the conventional standard OFDMA frame structure definition (e.g. as illustrated in FIG. 3A). The OFDMA frame is of a time-frequency 2D structure, whose longitudinal coordinate unit is sub-channel and horizontal coordinate unit is symbol. The smallest unit of media access control (MAC) layer schedules is slot consisting of a sub-channel and one or more symbols, and the exact number of symbols is determined by sub-carrier mapping mode. Each frame is divided into an uplink frame and a downlink frame in terms of time. The boundary between uplink and downlink is transmit/receive transition gap (TTG) and receive/transmit transition gap (RTG). Each downlink frame starts with a preamble that is followed by a frame control header (FCH), downlink map (DL-MAP) and uplink map (UL-MAP) in succession. The downlink map closely follows the frame control header, and the uplink map closely follows the downlink map. Subsequently, downlink bursts and uplink bursts come along. The arrangement mode of downlink bursts and downlink code modulation mode are specified by the downlink map, and the corresponding arrangement mode of uplink bursts and uplink code modulation mode are specified by the uplink map.

As illustrated in FIG. 3B, a dedicated control information relay zone is reserved in the OFDMA relay frame structure proposed by the present invention for UL control information forwarding, e.g. ranging request relay, where this relay zone is designed to be at or near the end of UL frames. The ranging sub-channel information should be located preceding the control information relay zone. Thus, the ranging request of SS 110 received by RS 120 can be retransmitted through the relay zone within the same frame for the benefit that no additional latency during the process of forwarding the ranging request or relaying other UL control signal is required.

In the present invention, the RS entry and initialization processes are the same as those for a conventional SS, except that RS has special relay connection identifiers. BS allocates special connection identifiers (CIDs) for relaying. Later, BS 130 treats it differently from the conventional SS through these CIDs. Thus, the present invention has made some improvements to BS 130 to distinguish RS.

For the present invention, to guarantee the backward compatibility, there is no change on SS 110. SS 110 just processes as the conventional flow. In other words, RS 120 is transparent to SS, which is one of the key advantages of the present invention. As for the downlink channel scanning and synchronization, the process is exactly the same as the conventional, so that BS broadcasts synchronization and map information without modification, and SS 110 synchronizes to the downlink for downlink and uplink parameters.

Figure 4:
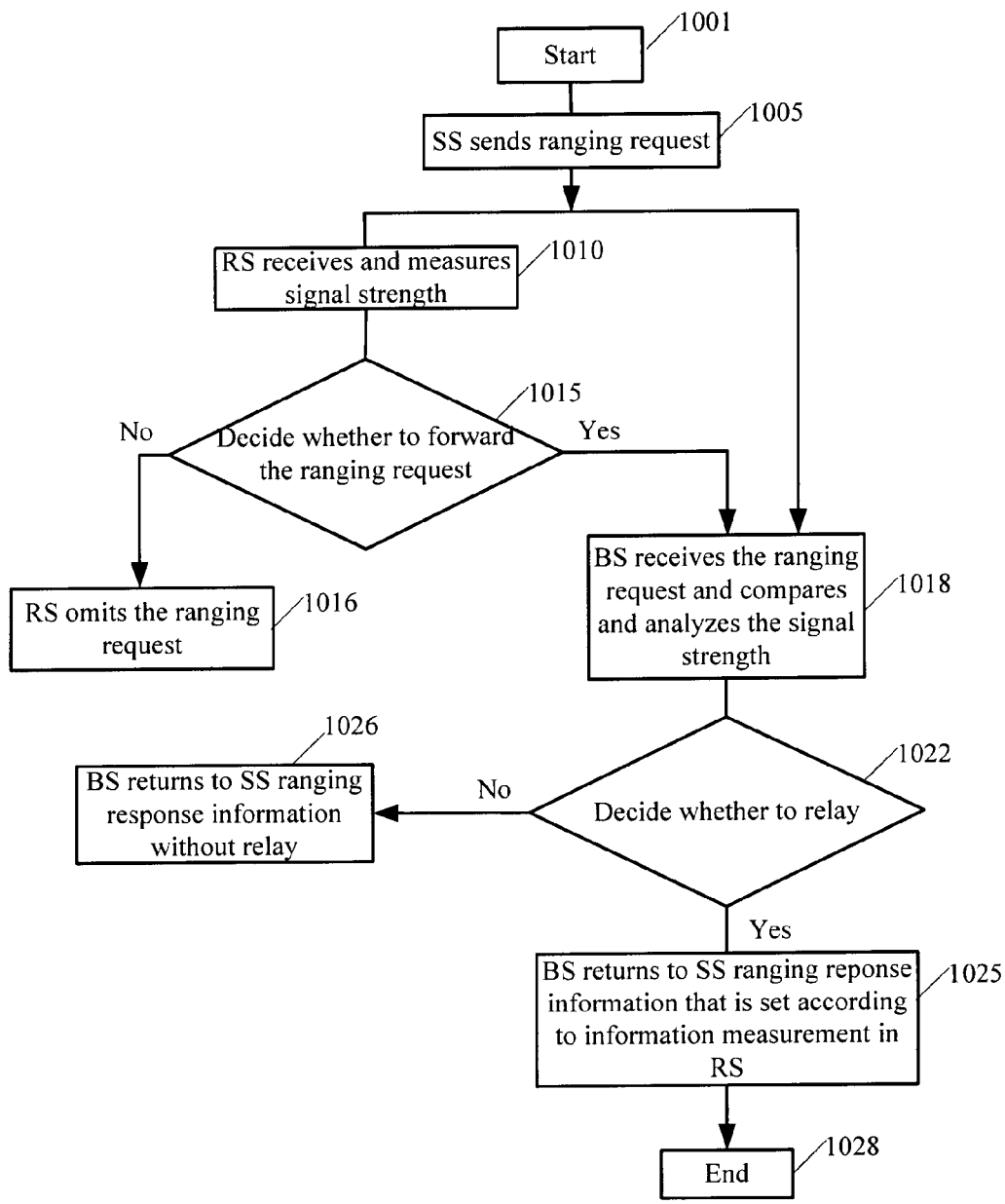
FIG. 4 depicts a flowchart of ranging request response procedures according to a preferred embodiment of the present invention.
Figure 5:
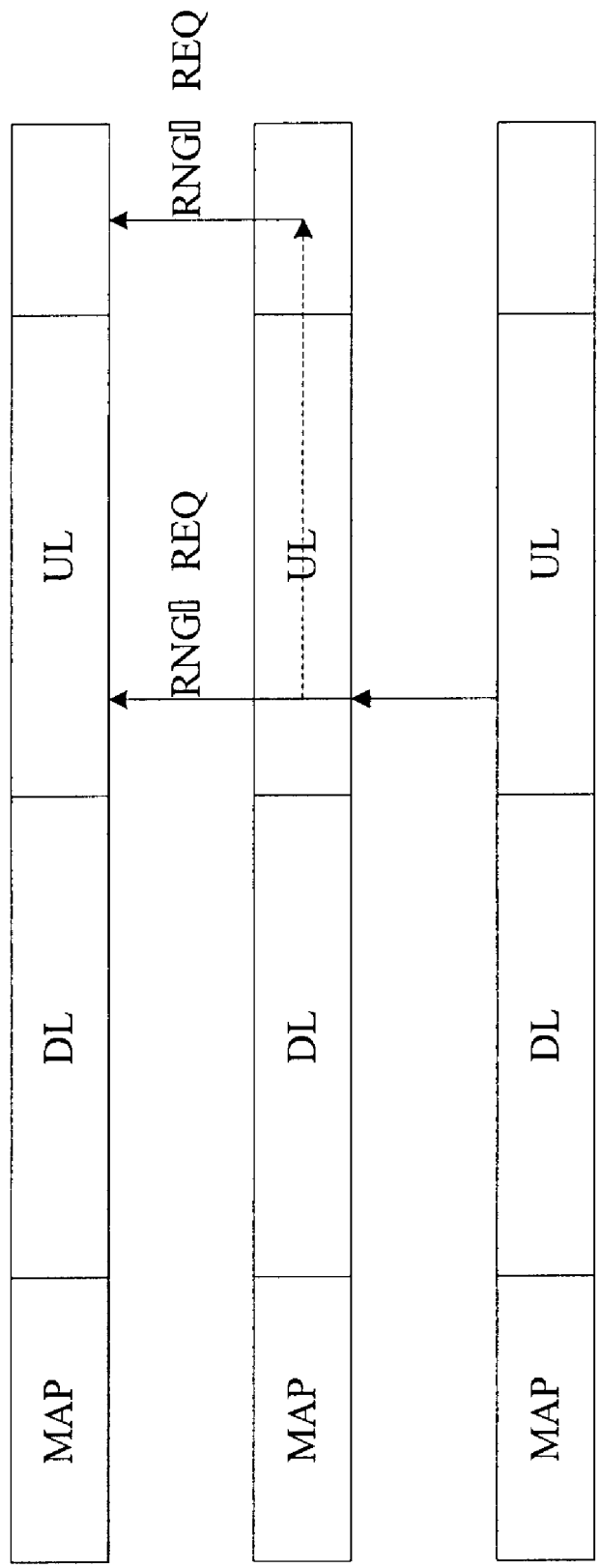
FIG. 5 depicts a schematic view of ranging request information relay according to a preferred embodiment of the present invention.

During SS accessing to BS, there is only one difference from the existing methods. That is, the ranging procedures are performed with RS 120 involvement. During the ranging procedures, first, SS 110 should synchronize to the downlink and learn the uplink channel characteristics through the UCD (uplink channel descriptor) MAC management message. At this point, SS 110 scans the UL-MAP message to find an initial ranging interval. Referring to FIGS. 4 and 1A, a detailed description will be given to a preferred embodiment of the present invention, namely a flow of ranging request message response process. The flow as illustrated in FIG. 4 starts in step 1001. In step 1005, SS sends the ranging request message RNG-REQ. In this process, RS 120 keeps monitoring ranging requests generated by respective SSs. Several SSs might send ranging requests, and these ranging requests are detected by RS. In step 1010, RS receives the ranging request messages from SSs and measures the signal strength. It is possible that some SSs, e.g. SS 115, might be located nearer to BS than to RS. In step 1015, RS 120 judges based on the signal strength and selects right SSs 110 which may benefit from relaying, to determine whether to forward the ranging requests. Only ranging requests with the stronger signal level measured at RS 120 are forwarded to BS 130 in the dedicated control information relay zone reserved in advance. The forwarded ranging request is exactly the same as the original one of SS. If the signal is relatively weak, then the ranging request is omitted, and the flow goes to step 1016 without relaying. If the signal level of the ranging request is judged to be relatively strong, then the flow goes to step 1018 in which the ranging request is forwarded to BS and the signal strength is reported. In step 1018, BS 130 might receive two copies of ranging requests, one of which is directly from SS 110 or 115 and the other of which is relayed from RS 120. BS 130 knows that the received ranging request in the dedicated relay zone is a repeated one forwarded by RS 120. In step 1022, BS measures and compares these two copies of ranging requests through judging the signal strength, and decides if relaying is necessary for said SS. If the signal quality of the communication between SS 115 and BS 130 is good enough, relaying is not needed, and the flow goes to step 1026. BS 130 just returns a RNG-RSP message to SS 115 without considering the existence of relaying. All following procedures are the same as the conventional wireless access process. However, if the direct connection is of bad quality due to the long distance or the shadowing between BS 130 and SS 110, while signal quality of between SS 110 and RS 120 is good for high data throughput, then relaying is required for throughput enhancement. Moreover, in some cases, the connection signal between SS 110 and BS 130 is too weak for BS 130 to directly detect the ranging request from SS 110, and only the ranging request relayed by RS 120 can be received by BS 130 through dedicated control information relay zone. In this case, BS 130 also requires relaying for SS 110, and the flow goes to step 1025. In step 1025, in order to support relaying, BS 130 returns to SS 110 a RNG-RSP message by using the initial ranging CID. But the RF power strength contained in the RNG-RSP is adjusted according to signal level measurement in RS. All the uplink transmission from these SSs 110 should be firstly received by RS 120 and relayed to BS 130, so the SS's 110 power strength should be adjusted to accommodate to the transmission distance of the connection between SS 110 and RS 120. The same adjustment is performed for synchronization offset corrections in SS 110. From the viewpoint of SS 110, it takes RS as a BS and all uplink information passes through this dummy BS. The present operation ends in step 1028.

Figure 6:
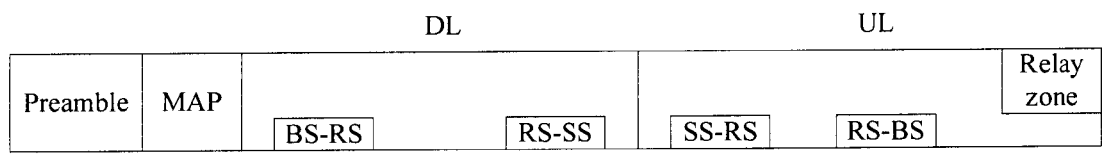
FIG. 6 depicts time slots allocation for a relay station and a subscriber station according to a preferred embodiment of the present invention.

During the transmission and reception procedures, RS 120 plays a role of a proxy for SS 110 to connect to BS 130. All information, except the DL control information, is received at RS 120 and forwarded to BS 130 or SS 110. BS 130 allocates repeated resources for RS 120 and SS 110. For the purpose to avoid complexity in RS, both SS and RS receive and transmit data according to BS's instructions. FIG. 6 depicts resources allocation (including sub-carrier and time slot resources) of RS 120 and SS 110. In the downlink, bearer data is firstly transmitted in bursts which BS 130 allocated for RS 120 and then transferred to SS 110 by RS 120 according to BS's 130 instructions and allocation. The burst sent for SS 110 is always after the one for RS 120. Therefore, RS 120 has enough time to process the received data and then forwards it when the burst of SS is coming. By this means, intra-cell handover in downlink is not required. When the SS 110 is leaving from RS 120 for BS 130, it can still maintain its downlink connection. BS 130 notifies RS 120 of the downlink resources allocation via an additional data field.

Figure 7:
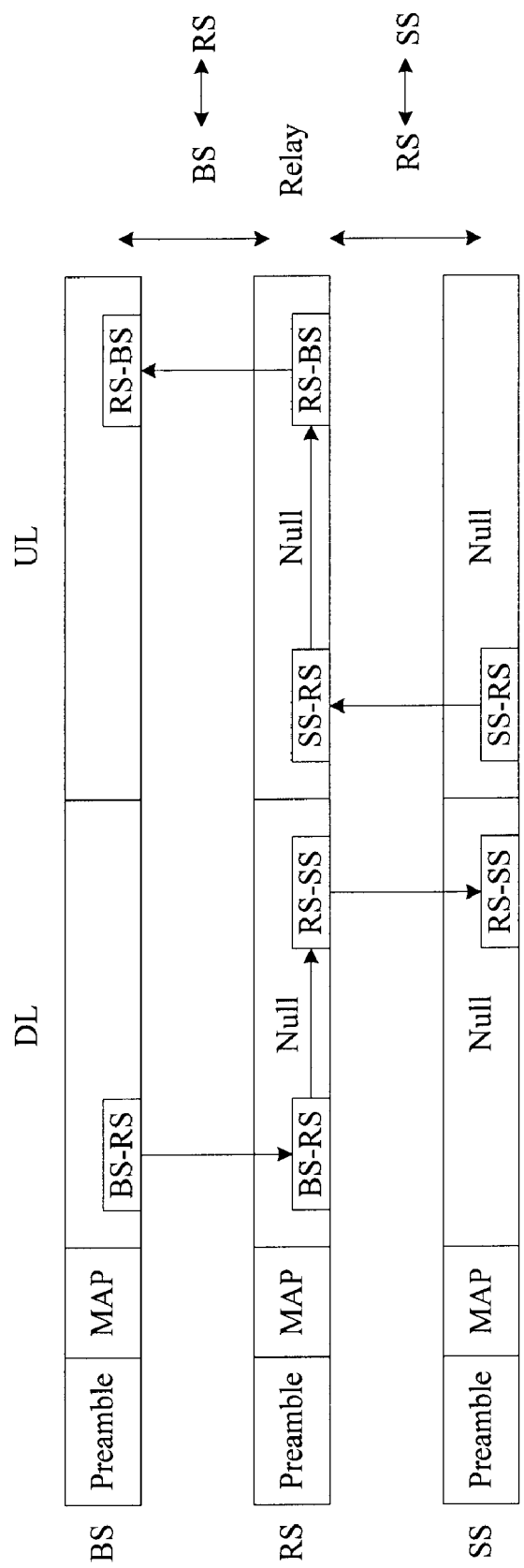
FIG. 7 depicts the transmission order of the downlink/uplink transmission according to a preferred embodiment of the present invention.

In the corresponding uplink transmission, the burst allocated for RS 120 follows the burst of SS 110. SS's 110 data is forwarded in the burst allocated for RS 120 to BS. During the corresponding uplink transmission, BS 130 simultaneously detects data in both the SS's 110 burst and RS's 120 burst and checks the validity and quality of the data. Likewise, information transferred via RS 120 is usually of good signal quality and will be used by BS. In some cases, in the burst of SS 110, BS 130 might receive no information, then BS will skip over comparison and directly use relayed data block. FIG. 7 further depicts the transmission order of information in the DL/UL transmission.

Figure 8:
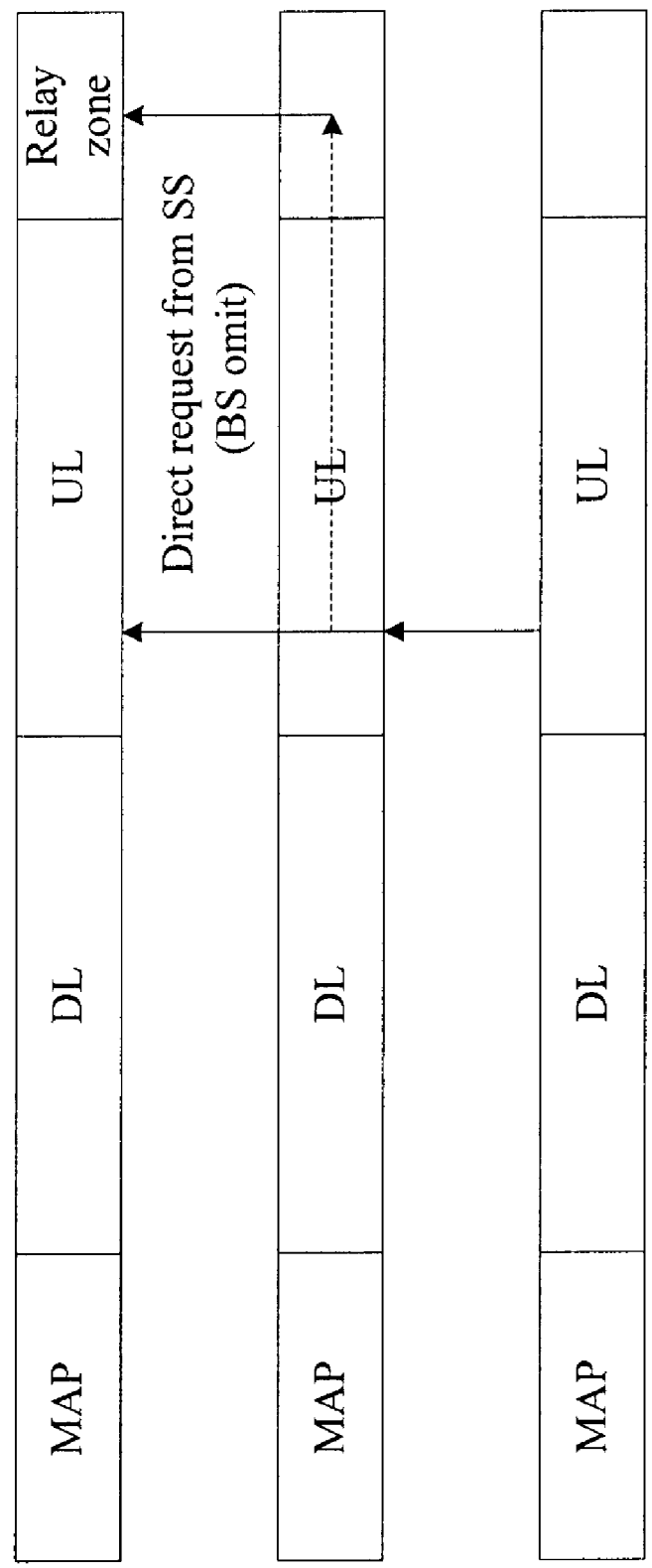
FIG. 8 depicts resource request relay according to a preferred embodiment of the present invention.

Moreover, RS can also be used for resource request forwarding. As illustrated in FIG. 8, in an embodiment of the present invention, resource request is received by RS 120 and forwarded to BS 120 in the dedicated control information relay zone. Thus, BS 130 receives the resource request in the same frame and can give response in the next frame. So, there is no additional latency in resource request and grant procedures. The resource request directly issued by SS 110 will be omitted by BS.

The relay leads to short-range radio transmission and certain line of sight in most cases, which achieves greater signal-to-noise ratio (SNR) and therefore higher signal quality and data rate for users. By avoiding shadowing and filling coverage gaps through relays, the system can have a wider and seamless coverage. Furthermore, the introduction of relay technique can decrease power consumption and is of benefit to WiMAX mobile applications. Lastly, relays do not have a wired connection to the BS and therefore result in low network deployment investment and fast network installation.

Figure 1B:
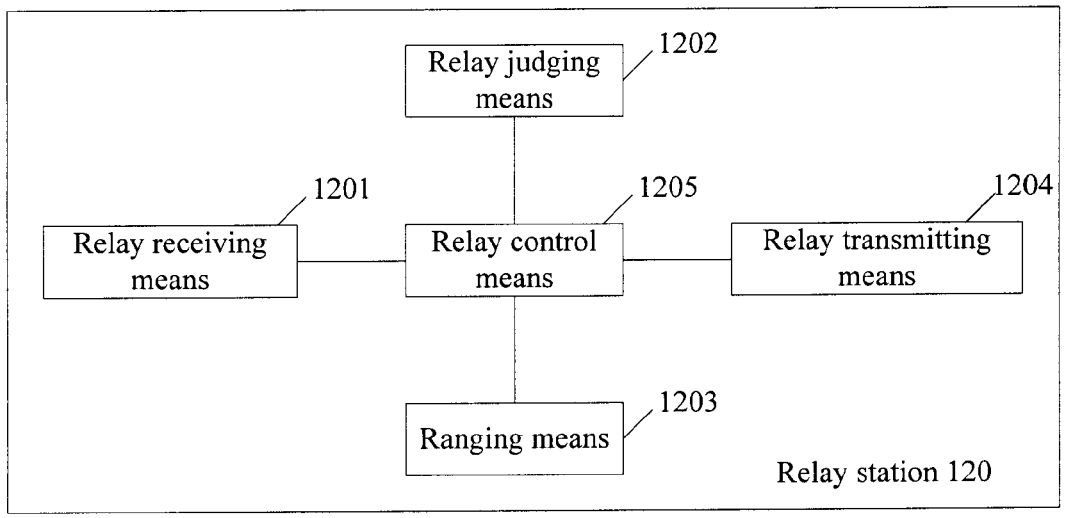
FIG. 1B depicts a layout block diagram of a relay station according to a preferred embodiment of the present invention.

As described above, in order to implement the above wireless access control method, the present invention provides RS 120. As illustrated in FIG. 1B, RS 120 comprises: relay control means 1205 for controlling the operation of RS; relay receiving means 1201 for receiving information of SS and BS over wireless channels; and relay transmitting means 1204 for transmitting information to SS and BS via wireless channels. Under the control of relay control means 1205, said relay receiving means 1201 receives UL bearer data and control information from SS, which are then forwarded to said BS by relay transmitting means 1204. Relay receiving means 1201 receives DL bearer data from said BS, which is then forwarded to said SS by relaying transmitting means 1204. RS 120 may further comprise: ranging means 1202 for measuring the signal strength of a ranging request of said SS; and relay judging means 1203 for making analysis and judgment to decide whether to relay the forwarded information.

Figure 1C:
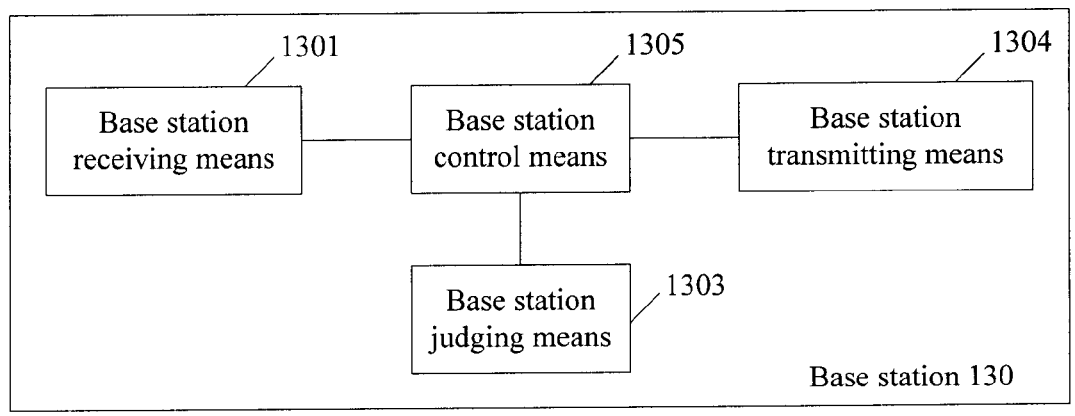
FIG. 1C depicts a layout block diagram of an improved base station according to a preferred embodiment of the present invention.

In addition, to achieve the object of the present invention, further provided is improved BS 130. As illustrated in FIG. 1C, BS 130 comprises: base station control means 1305 for controlling reception and transmission of information; base station receiving means 1301 for receiving information of SS and RS over wireless channels; and base station transmitting means 1304 for transmitting information to SS and RS via wireless channels. Under the control and schedule of base station control means 1305, said base station receiving means 1301 receives UL bearer data and control information from said RS; and said base station transmitting means 1304 transmits DL bearer data to said RS. Said base station transmitting means 1304 directly transmits control information to said SS.

Furthermore, said BS 130 may further comprise base station judging means 1303 for judging whether to relay according to the signal level strength measured by said RS and SS's information. Base station control means 1305 indicates base station transmitting means 1304 to return ranging response information to said SS. Said ranging response information comprises RF power strength and synchronization offset corrections adjusted according to signal measurement information in RS.

As the embodiments of the present invention have been described with reference to the accompanying drawings, various modifications or alterations can be made by those skilled in the art without departing from the scope as defined by the appended claims.

What is claimed is:

1. A wireless access control method in a wireless access network comprising a base station for receiving and sending information over a wireless channel, said method comprising:
   under the control of said base station, using a relay station to receive and forward information of a subscriber station and said base station over said wireless channel;
   said relay station receiving uplink bearer data and uplink control information from said subscriber station and forwarding said uplink bearer data and uplink control information to said base station; and
   said relay station receiving downlink bearer data from said base station and forwarding downlink bearer data to said subscriber station; and
   said base station sending downlink control information directly to said subscriber station.

2. The method according to claim 1, further comprising:
   said wireless channel setting a dedicated control information relay zone in said uplink frame using an orthogonal frequency division multiple access frame structure that comprises an uplink frame and a downlink frame.

3. The method according to claim 2, wherein said dedicated control information relay zone is located at or near the end of said uplink frame.

4. The method according to claim 2, wherein said frame structure comprises bursts, and further comprising:
   in said uplink transmission, said relay station's burst allocation following said subscriber station's burst allocation, and said subscriber station's information being forwarded in the burst allocation from the relay station to the base station;
   said downlink bearer data being first sent in the burst which said base station allocated for said relay station and then being forwarded to said subscriber station by said relay station according to instructions of said base station, the burst sent to the subscriber station always following the burst sent to said relay station.

5. The method according to claim 3, further comprising:
   said subscriber station sending ranging request information;
   said relay station measuring the signal strength of said subscriber station's ranging request and forwarding the ranging request with stronger signal to said base station via said dedicated control information relay zone, other weaker requesting request being omitted by the relay station; and
   said base station deciding whether to relay.

6. The method according to claim 5, further comprising:
   if relay is needed, the base station returning ranging response information to the subscriber station according to timing offset and signal level strength measured by said relay station, wherein said ranging response information comprises RF power strength and synchronization offset corrections.

7. The method according to claim 3, further comprising:
   said base station notifying the relay station of downlink resources allocation via an additional data field.

8. The method according to claim 3, further comprising:
   said relay station forwarding a resource request, and upon receipt of the resource request, said relay station forwarding it to said base station in said dedicated control information relay zone; and
   said base station receiving the resource request and giving response.

9. The method according to claim 1, wherein:
   said base station allocates connection identifiers for said relay station.

10. A relay station comprising:
    a relay controller that is operative to control the operation of the relay station;
    a relay receiver that is operative to receive information of a subscriber station and a base station over a wireless channel;
    a relay transmitter that is operative to transmit information to the subscriber station and the base station via the wireless channel; and
    a range measurer that is operative to measure signal strength and timing offset of a ranging request of said subscriber station, and to forward the ranging request with a stronger signal to said base station via a dedicated control information relay zone, and omit weaker ranging requests.

11. The relay station according to claim 10, wherein said wireless channel comprises uplinks and downlinks, said information comprises control information and bearer data, and wherein:
    said relay receiver receives uplink bearer data and control information from said subscriber station, which are forwarded to said base station by the relay transmitter; and
    said relay receiver receives downlink bearer data from said base station, which is forwarded to said subscriber station by the relay transmitter.

12. The relay station according to claim 10, wherein:
    said wireless channel uses an orthogonal frequency division multiple access frame structure that comprises an uplink frame and a downlink frame, and a dedicated control information relay zone is set in said uplink frame.

13. A base station comprising:
    a base station controller that is operative to control information receiving and transmitting operations;
    a base station receiver that is operative to receive uplink bearer data and uplink control information of a subscriber station and a relay station over a wireless channel; and
    a base station transmitter that is operative to transmit downlink bearer data to the subscriber station via the relay station wireless channel, wherein said base station transmitter sends downlink control information directly to said subscriber station.

14. The base station according to claim 13, wherein:
said wireless channel uses an orthogonal frequency division multiple access frame structure that comprises an uplink frame and a downlink frame, and a dedicated control information relay zone is set in said uplink frame.

15. The base station according to claim 13, further comprising:
a base station judging mechanism that is operative to decide whether to relay according to the signal level strength measured by said relay station.

16. A wireless access control method in a wireless access network comprising a base station for receiving and sending information over a wireless channel, said method comprising:
under the control of a base station, using a relay station to receive and forward information of said subscriber station and said base station over said wireless channel;
said relay station receiving uplink bearer data and uplink control information from said subscriber station and forwarding said uplink bearer data and uplink control information to said base station; and
said relay station receiving downlink bearer data from said base station and forwarding downlink bearer data to said subscriber station;
said base station sending downlink control information directly to said subscriber station
said base station receiving ranging request information from a subscriber station;
said relay station measuring the signal strength of said subscriber station's ranging request and forwarding the ranging request with stronger signal to said base station via said dedicated control information relay zone, other weaker requesting request being omitted by the relay station; and
receiving a message indicating whether said base station has decided to relay.

17. The method according to claim 16, further comprising:
said wireless channel setting a dedicated control information relay zone in said uplink frame using an orthogonal frequency division multiple access frame structure that comprises an uplink frame and a downlink frame.

18. The method according to claim 16, wherein said dedicated control information relay zone is located at or near the end of said uplink frame.

19. The method according to claim 16, wherein said frame structure comprises bursts, and further comprising:
in said uplink transmission, said relay station's burst allocation following said subscriber station's burst allocation, and said subscriber station's information being forwarded in the burst allocation from the relay station to the base station;
said downlink bearer data being first sent in the burst which said base station allocated for said relay station and then being forwarded to said subscriber station by said relay station according to instructions of said base station, the burst sent to the subscriber station always following the burst sent to said relay station.

20. The method according to claim 16, further comprising:
if relay is needed, the base station returning ranging response information to the subscriber station according to timing offset and signal level strength measured by said relay station, wherein said ranging response information comprises RF power strength and synchronization offset corrections.

* * * * *